United States Patent
Paulding et al.

(10) Patent No.: US 9,895,948 B2
(45) Date of Patent: Feb. 20, 2018

(54) SPRING ISOLATORS AND SUSPENSION SYSTEMS INCORPORATING SAME

(71) Applicant: FORD GLOBAL TECHNOLOGIES, LLC, Dearborn, MI (US)

(72) Inventors: Jason Paulding, Cologne (DE); Juergen Funke, Leverkusen (DE); Jon Roland Watson, Canton, MI (US); Thorsten Dirk Krupp, Duisburg (DE); Paul Godesberg, Cologne (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/887,801

(22) Filed: Oct. 20, 2015

(65) Prior Publication Data
US 2016/0107497 A1 Apr. 21, 2016

(30) Foreign Application Priority Data
Oct. 21, 2014 (DE) .......................... 10 2014 221 283

(51) Int. Cl.
*B60G 11/52* (2006.01)
*B60G 15/06* (2006.01)

(52) U.S. Cl.
CPC ............ *B60G 11/52* (2013.01); *B60G 15/063* (2013.01); *B60G 15/065* (2013.01); *B60G 2202/312* (2013.01); *B60G 2204/12422* (2013.01)

(58) Field of Classification Search
CPC ...... B60G 11/52; B60G 11/22; B60G 15/063; B60G 15/065; B60G 2202/312; B60G 2204/12422

USPC .......................................... 267/33, 220, 292
See application file for complete search history.

(56) References Cited

U.S. PATENT DOCUMENTS

| | | | | |
|---|---|---|---|---|
| 4,562,997 A | * | 1/1986 | Iwata ................... | B60G 15/063 267/170 |
| 5,676,355 A | * | 10/1997 | Hayashi ............... | B60G 15/063 188/322.12 |
| 6,149,171 A | * | 11/2000 | Bono ..................... | F16F 1/126 280/124.179 |

(Continued)

FOREIGN PATENT DOCUMENTS

| | | |
|---|---|---|
| DE | 102009052030 A1 | 5/2011 |
| JP | 2003118341 A * | 4/2003 |

OTHER PUBLICATIONS

Machine Translation in English for JP 2003-118341A, Inventor Arakawa et al.; 9 pages; Retrieve Date: Aug. 8, 2016.*

(Continued)

*Primary Examiner* — Thomas J Williams
*Assistant Examiner* — Mariano Sy
(74) *Attorney, Agent, or Firm* — Jones Robb, PLLC; Raymond Coppiellie

(57) ABSTRACT

A spring isolator for a wheel suspension may include a first side configured to rest on a spring plate of the suspension. The spring isolator may also include a second side, opposite the first side, configured to receive a last coil of a coil spring of the suspension to support the coil spring on the spring plate. The first side may have at least one cavity extending through a thickness of the isolator toward the second side. An elasticity of the isolator between the first and second sides may prevent the last coil from breaking contact with the second side during operation of the suspension.

22 Claims, 9 Drawing Sheets

(56) References Cited

U.S. PATENT DOCUMENTS

| | | | | |
|---|---|---|---|---|
| 6,155,544 A * | 12/2000 | Solomond | ............... | B60G 11/52 |
| | | | | 267/170 |
| 6,260,836 B1 * | 7/2001 | Aoyama | ............... | B60G 15/063 |
| | | | | 267/179 |
| 6,273,407 B1 * | 8/2001 | Germano | ............. | B60G 13/005 |
| | | | | 267/172 |
| 6,382,648 B1 * | 5/2002 | Handke | ................ | B60G 15/063 |
| | | | | 267/170 |
| 7,806,392 B2 * | 10/2010 | Ishikawa | ............. | B60G 15/063 |
| | | | | 267/179 |
| 8,113,496 B2 * | 2/2012 | Fritz | .................... | B60G 15/063 |
| | | | | 248/613 |
| 2014/0265081 A1 * | 9/2014 | Nakano | .................. | B60G 11/16 |
| | | | | 267/220 |
| 2016/0031280 A1 * | 2/2016 | Arano | .................... | B60G 11/16 |
| | | | | 267/219 |

OTHER PUBLICATIONS

German Examination Report for corresponding German Application No. 10 2014 221 283.9, dated Jul. 3, 2015.

* cited by examiner

SPRING ISOLATORS AND SUSPENSION SYSTEMS INCORPORATING SAME

CROSS REFERENCE TO RELATED APPLICATIONS

This application claims priority to German Application No. 102014221283.9, filed on Oct. 21, 2014, the entire content of which is incorporated by reference herein.

TECHNICAL FIELD

The present disclosure relates generally to spring isolators for wheel suspensions. In particular, the present disclosure relates to spring isolators for wheel suspensions for motor vehicles and wheel suspension systems and methods incorporating same.

BACKGROUND

Vehicles, such as, for example, motor vehicles, are typically provided with a suspension system to reduce or damp the transmission of vibrations from the road surface upon which the vehicle is traveling to the occupants of the vehicle. Such suspension systems frequently comprise one or more shock absorbers, spring struts and/or springs. Coil springs, for example, are commonly used within the damper system of a vehicle suspension.

A coil spring may, for example, be seated on a spring plate such that at least a portion of a last coil of the spring rests on the spring plate. In this manner, when force is applied to the coil spring, such that the coils of the spring are compressed along a longitudinal axis of the spring, the contact area between the spring plate and the last coil of the coil spring (i.e., resting on the spring plate) enlarges. Also, coil springs have a tendency to curve or bend slightly under compression. In other words, a coil spring will bend relative to its longitudinal axis when the coils of the coil spring are compressed along the longitudinal axis. Due to the axial force and the bending of the coil spring, the size of the contact area changes and/or a relative movement occurs between the spring plate and the last coil of the coil spring resting on the spring plate. This phenomenon of a moving contact boundary is, for example, often referred to as rolling contact.

An elastic insert, or spring isolator, is also generally inserted between the coil spring and the spring plate to damp the transmission of vibrations to the coil spring and the occurrence of noise between the parts. Because of the abovementioned relative movement between the coil spring and the spring plate or spring isolator (i.e., rolling contact), foreign particles, such as, for example, particles of dirt, sand grains, or other particulate debris may penetrate into the contact area (i.e. of changing size) between the last coil of the coil spring and the spring plate or spring isolator. Because of the frequently recurring movements of the coil spring during operation of the wheel suspension, such ingress of debris can lead to abrasion of the paint coating normally applied to the coil spring. When the paint coating has been completely abraded from the coil spring, corrosion can occur on the then exposed metal of the coil spring, which may lead to premature failure of the coil spring or require premature replacement of the coil spring.

It may, therefore, be advantageous to provide a spring isolator for a wheel suspension of a vehicle in which the risk of corrosion of the coil spring, due to movement of the coil spring relative to the spring isolator during operation of the vehicle suspension, is either absent or at least reduced. It may also be advantageous to provide a spring isolator that sufficiently damps the transmission of vibrations from the spring plate to the coil spring, and the occurrence of noise at the coil spring and spring plate.

SUMMARY

In accordance with various embodiments of the present disclosure, a spring isolator for a wheel suspension may include a first side configured to rest on a spring plate of the suspension. The spring isolator may also include a second side, opposite the first side, configured to receive a last coil of a coil spring of the suspension to support the coil spring on the spring plate. The first side may have at least one cavity extending through a thickness of the isolator toward the second side. An elasticity of the isolator between the first and second sides may prevent the last coil from breaking contact with the second side during operation of the suspension.

In accordance with various additional embodiments of the present disclosure, a wheel suspension may include a coil spring, a spring plate, and a spring isolator positioned between the coil spring and the spring plate. The spring isolator may include first and second opposite sides. The first side may rest on the spring plate and the second side may support a last coil of the coil spring. The first side may have at least one cavity extending through a thickness of the isolator toward the second side. The at least one cavity may be configured to maintain contact between the last coil and the second side during operation of the suspension.

In accordance with various further embodiments of the present disclosure, a method for maintaining contact between a coil spring and a spring isolator under a vertical force on the spring may include, during application of the force, expanding a material forming the spring isolator into a cavity within the isolator to increase an elasticity of the isolator. The method may also include following spring movements of the coil spring with the spring isolator such that a contact surface area between the isolator and the spring remains constant.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
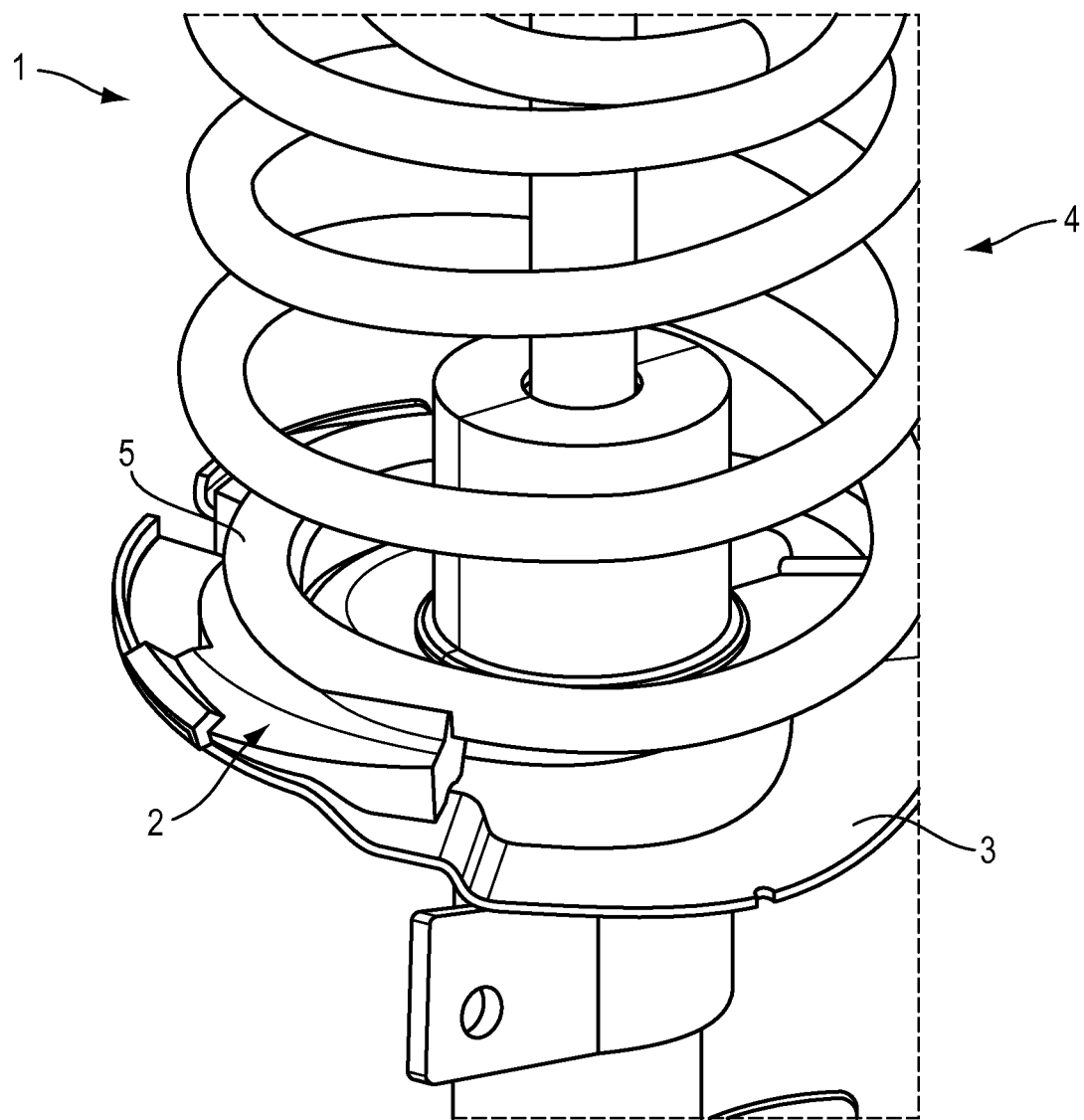
FIG. 1 is a partial perspective view of an exemplary embodiment of a wheel suspension incorporating an exemplary embodiment of a spring isolator in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

In accordance with various exemplary embodiments, the present disclosure contemplates spring isolators for a wheel suspension of a motor vehicle that may minimize and/or prevent corrosion of the coil spring of the suspension, due to movement of the coil spring relative to the spring isolator during operation of the vehicle suspension. For instance, the exemplary embodiments described herein contemplate eliminating or substantially reducing rolling contact between the last coil of the coil spring and the spring isolator.

Various embodiments of the present disclosure contemplate, for example, a spring isolator including a first side that is configured to rest on a spring plate; and a second side, opposite the first side, that is configured to receive the last coil of the coil spring to support the coil spring on the spring plate. The first side of the spring isolator has at least one cavity extending through a thickness of the isolator toward the second side of the isolator. And, elasticity between the first and second sides may prevent the last coil from breaking contact with the second side during operation of the suspension (i.e., thereby preventing rolling contact).

As used herein, the last coil of the coil spring is the coil at an axial end of the coil spring, which in a mounted state within the wheel suspension, is arranged directly adjacent to the spring plate and supports the coil spring on the spring plate. In accordance with the present disclosure, at least a portion of the last coil lies on and is supported by the second side of the spring isolator, and the contact between the last coil and the second side forms a contact area between the last coil and the second side of the spring isolator.

As used herein, the elasticity between the first and second sides describes the elasticity in a vertical direction between the first and second sides. In accordance with the present disclosure, for example, this elasticity is such that the size of the contact area between the last coil of the coil spring and the second side of the spring isolator remains substantially constant under a maximum possible deflection of the coil spring during operation of the vehicle wheel suspension. The deflection of the coil spring means both its compression, for example on compression of the wheel suspension, and its extension, for example on rebound of the wheel suspension. Accordingly, the maximum deflection of the coil spring defines its maximum spring travel in a mounted state within the wheel suspension. In other words, the elasticity of the spring isolators in accordance with the present disclosure allows them to follow all possible spring movements of the last coil. In this manner, the last coil does not lift away from the second side of the spring isolator, and the contact area between the second side and the last coil remains substantially the same (i.e., does not change size significantly) during the spring movements of the coil spring.

Because the size of the contact area between the second side of the spring isolator and the last coil of the coil spring remains substantially constant, even under a maximum deflection of the coil spring during operation of the wheel suspension in a vehicle, foreign particles, such as, for example, dirt particles, sand grains or other particulate debris, are prevented from entering the contact area. Consequently, the paint coating applied to the coil spring is protected from abrasion and eventual corrosion.

The elasticity of the spring isolators in accordance with the present disclosure also helps prevent the transmission of vibrations from the spring plate to the coil spring and the occurrence of noise at the coil spring or spring plate because of the relative movement between the parts.

As above, the first side of the spring isolator has at least one cavity extending through a thickness of the isolator toward the second side. In accordance with various exemplary embodiments, the elasticity of the spring isolator (i.e., between the first and second sides) can be adjusted via the at least one cavity. For example, various embodiments of the present disclosure contemplate spring isolators made from a rubber material, wherein the rubber is substantially incompressible. As would be understood by those of ordinary skill in the art, under a force, rubber may generally change its shape and/or form, but not its volume. Accordingly, the rubber material of the isolator, when under a force, may expand into the cavity. Such cavities, therefore, increase the elasticity of the spring isolator, thereby allowing the second side of the spring isolator to follow the spring movements of the coil spring during operation of the suspension (i.e., all compression and extension movements of the coil spring on suspension compression and rebound).

To guarantee that air can escape from the cavity when a force is applied to the spring isolator, or flow into the cavity upon removal of the force, the cavity may have an opening for ventilation and purging of the cavity. The opening may, for example, extend through a wall forming the cavity, such that a fluid-conductive connection is created between the interior of the cavity and the exterior air surrounding the spring isolator.

In accordance with various exemplary embodiments, the elasticity of the spring isolator is defined by the dimensions of the at least one cavity, such as, for example, a length, width, and depth of the cavity. Accordingly, when designing the spring isolator, its elasticity may be adjusted and set by selecting the dimensions of the at least one cavity. Various embodiments of the present disclosure contemplate, for example, spring isolators having cavities with a length ranging from about 20 mm to about 40 mm, a width ranging from about 5 mm to about 15 mm, and a depth ranging from about 2 mm to about 12 mm.

In accordance with various additional embodiments, the first side of the spring isolator has a plurality of cavities, extending through a thickness of the isolator toward the second side, separated from each other by a partition. And, the elasticity of the spring isolator is further defined by the partition or partitions, since the partitions may act as additional spring elements. In various embodiments, for example, the partitions run from the first side to the second side of the spring isolator, following the extension direction of the cavities from the first side to the second side, and the elasticity is further defined by a length and/or thickness of the partitions. Accordingly, when designing the spring isolator, the elasticity may also be adjusted and set by selecting the length and/or thickness of the partitions. Various embodiments of the present disclosure contemplate, for example, spring isolators having partitions with a length ranging from about 2 mm to about 10 mm and a thickness ranging from about 2 mm to about 12 mm.

In accordance with various further embodiments, the first side of the spring isolator also includes a channel or groove, at least within portions of the first side, running along its periphery. The channel may, for example, cover at least the underside of the partition or partitions (i.e., in embodiments having several cavities). In a similar fashion to the cavity or cavities within the first side, the dimensions (e.g., a width and/or depth) of this channel may further define the elasticity of the spring isolator. Accordingly, as above, when designing the spring isolator, the elasticity may be further adjusted and set by selecting the width and/or depth (i.e., amount of projection into the first side) of the channel. Various embodiments of the present disclosure contemplate, for example, spring isolators having channels, within a first side of the isolator, with a width ranging from about 5 mm to about 15 mm and a depth ranging from about 2 mm to about 12 mm.

In accordance with various additional embodiments, the second side of the spring isolator also includes a channel, at least within portions of the second side, running along its periphery, which is configured to receive and at least partially surround the last coil of the coil spring. In this manner, the second side of the spring isolator is held closely against the coil to also help prevent dirt particles, sand grains, and/or other particulate debris from getting into the contact area between the second side and the last coil. The channel also provides a degree of radial support for the coil spring on the spring isolator to help prevent the last coil of the coil spring from slipping on the spring isolator in the radial direction.

In various embodiments, for example, the channel includes a wall at least partially along one side of the channel, the wall having a first face configured to receive and at least partially surround the last coil (e.g., on its inside face facing the last coil, the wall is configured such that it continues the form of the channel described above for receiving and partially surrounding the coil). Thus the channel as a whole is enlarged by the wall and the above-mentioned advantages of the channel are further reinforced. Various embodiments of the present disclosure contemplate, for example, spring isolators with walls protruding from the second side having a height of about ⅓ the diameter of the last coil of the coil spring.

The wall of the channel (i.e., within the second side of the spring isolator) also has a second face, opposite the first face and facing away from the last coil, which has a chamfered edge. The chamfer of the wall may also help to ensure that foreign particles, such as, for example, dirt particles, sand grains and/or other particulate debris, are effectively deflected away from the region in which the end edge of the wall directly borders the coil. Various embodiments of the present disclosure contemplate, for example, spring isolators with walls protruding from the second side having chamfer angles of about 45° to the surrounding second side of the spring isolator.

In accordance with various further embodiments of the present disclosure, the spring isolator has a geometric design that, when placed on the spring plate, pretensions the first and second sides of the isolator in an axial direction of the coil spring. For example, in various embodiments, the spring isolator may be slightly curved and/or bent from inside to outside; so that the radially outer edge of the spring isolator is pressed firmly onto the spring plate after application of the spring isolator. This may prevent, for example, the spring isolator from lifting away from the spring plate, in particular in the region of the outer edge, when a force is exerted on the spring isolator by the coil spring. This design may also help to prevent foreign particles, such as dirt particles, sand grains or other particulate debris from getting between the spring isolator and the spring plate.

With reference now to the figures, FIG. 1 shows a partial perspective view of an exemplary embodiment of a wheel suspension in accordance with the present disclosure, which incorporates a spring isolator in accordance with the present disclosure. As illustrated in FIG. 1, a wheel suspension 1 includes a spring plate 3, a coil spring 4, and a spring isolator 2 inserted between the spring plate 3 and the coil spring 4. The coil spring 4, as shown in FIG. 1, generally comprises several coils of which one is distinguished as the last coil 5. As above, the last coil 5 is the coil at the axial end of the coil spring 4, which is arranged directly adjacent to the spring plate 3 and with which the coil spring 4 finally rests on the spring plate 3.

FIGS. 2-5 show various views of the spring isolator 2 of FIG. 1. The spring isolator 2 includes a first side 6 (see FIGS. 2 and 3) that is configured to rest on the spring plate 3; and a second side 7 (see FIGS. 4 and 5), opposite the first side 6, that is configured to receive the last coil 5 of the coil spring 4 to support the coil spring 4 on the spring plate 3. In the orientation of the spring isolator 2 shown in the exemplary suspension system 1, the first side 6 may be considered as the underside of the spring isolator 2 and the second side may be considered as the top side of the spring isolator 2.

Figure 2:
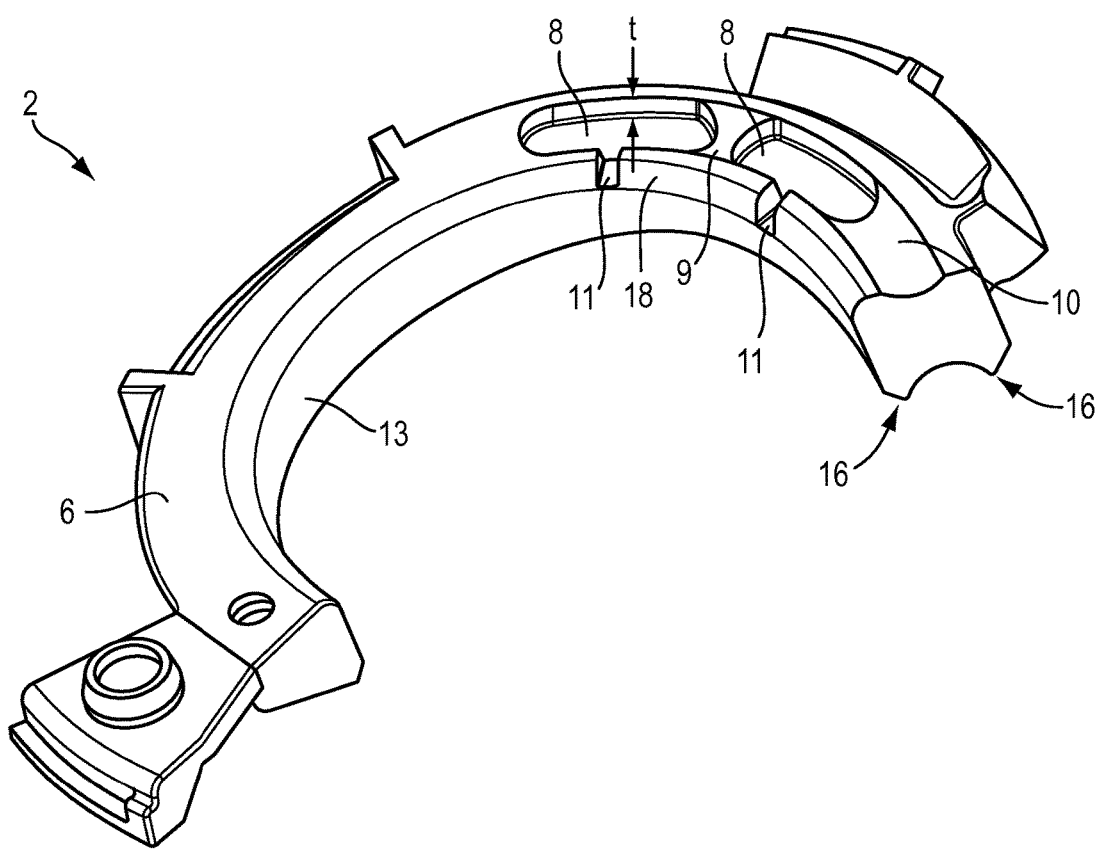
FIG. 2 is a perspective view of a first side of the spring isolator of FIG. 1.
Figure 3:
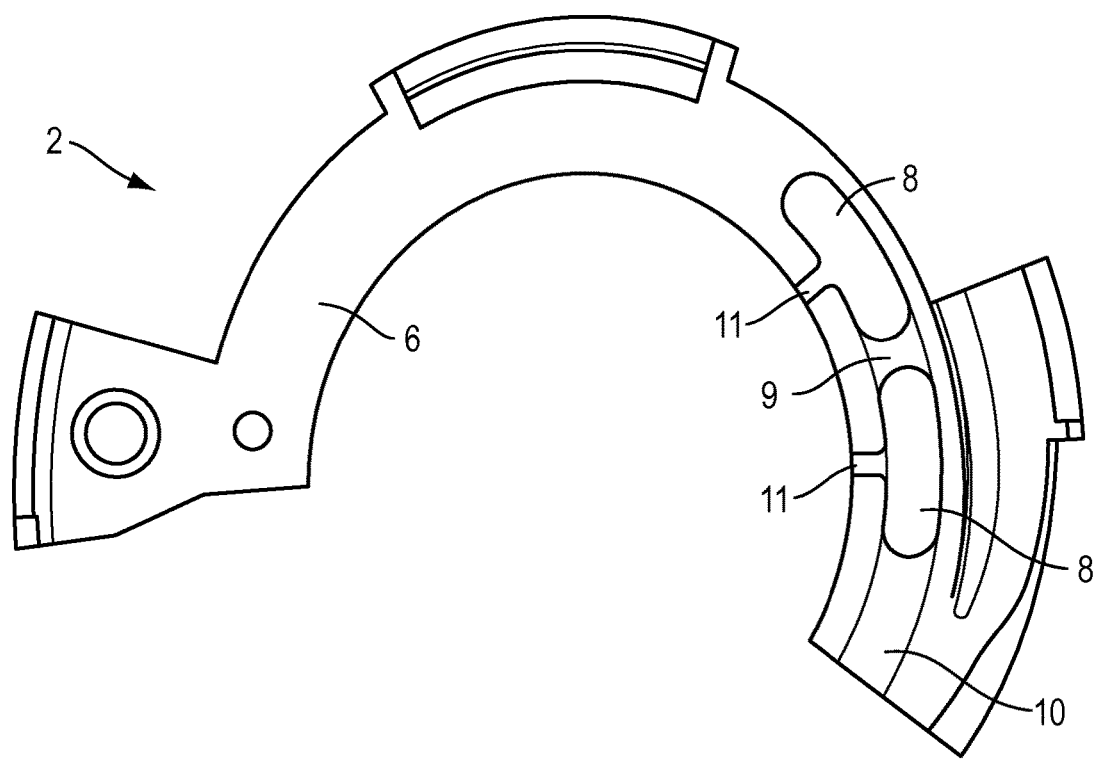
FIG. 3 is a top view of the first side of the spring isolator of FIG. 1.

With reference to FIGS. 2 and 3, the first side 6 of the spring isolator 2 includes two oblong cavities 8 extending through a thickness t of the isolator 2 toward the second side 7. In various embodiments, for example, the cavities may have an oval shape that is elongated along a circumferential direction of the isolator 2, as shown best perhaps in the top view of FIG. 3. Those of ordinary skill in the art would understand, however, that the spring isolator 2 may have various numbers of cavities with various different shapes without departing from the scope of the present teachings and claims.

The two cavities 8 are separated from each other by a partition 9. Each cavity 8 has an opening 11, which extends from each cavity 8 to an inside portion 18 of the spring isolator 2 or an adjacent cavity 8. As above, the openings 11 allow air to escape from the cavities 8 in the case that a force acts on the spring isolator 2 from its second side 7 (i.e., top side), and allows air to flow into the cavities 8 in the case that the force is effectively relieved from the second side 7. As shown best perhaps in FIG. 2, the first side 6 of the spring isolator 2 also includes a channel 10 within a portion of the spring isolator 2 extending around the two cavities 8. In this manner, as explained above, when designing the spring isolator 2, the dimensions of the cavities, partition, and/or channel can be adjusted to set the elasticity of the spring isolator 2 (i.e., between the first and second sides) to prevent the last coil 5 from breaking contact with the second side 7 during operation of the suspension 1.

Figure 4:
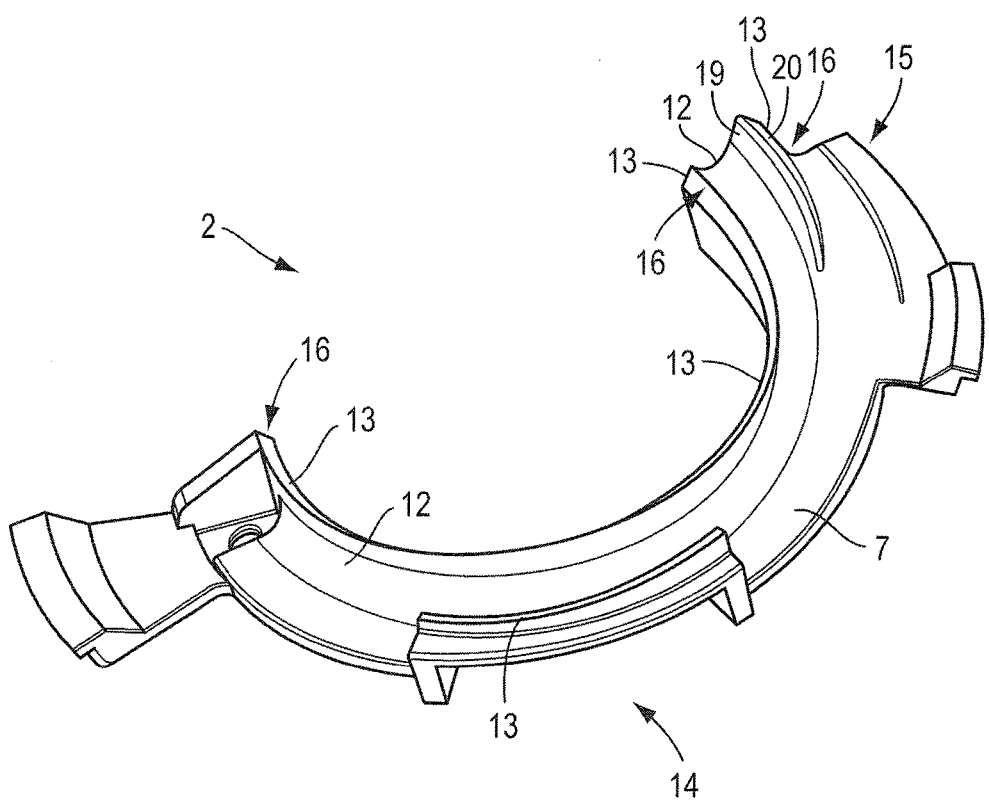
FIG. 4 is a perspective view of a second side of the spring isolator of FIG. 1.
Figure 5:
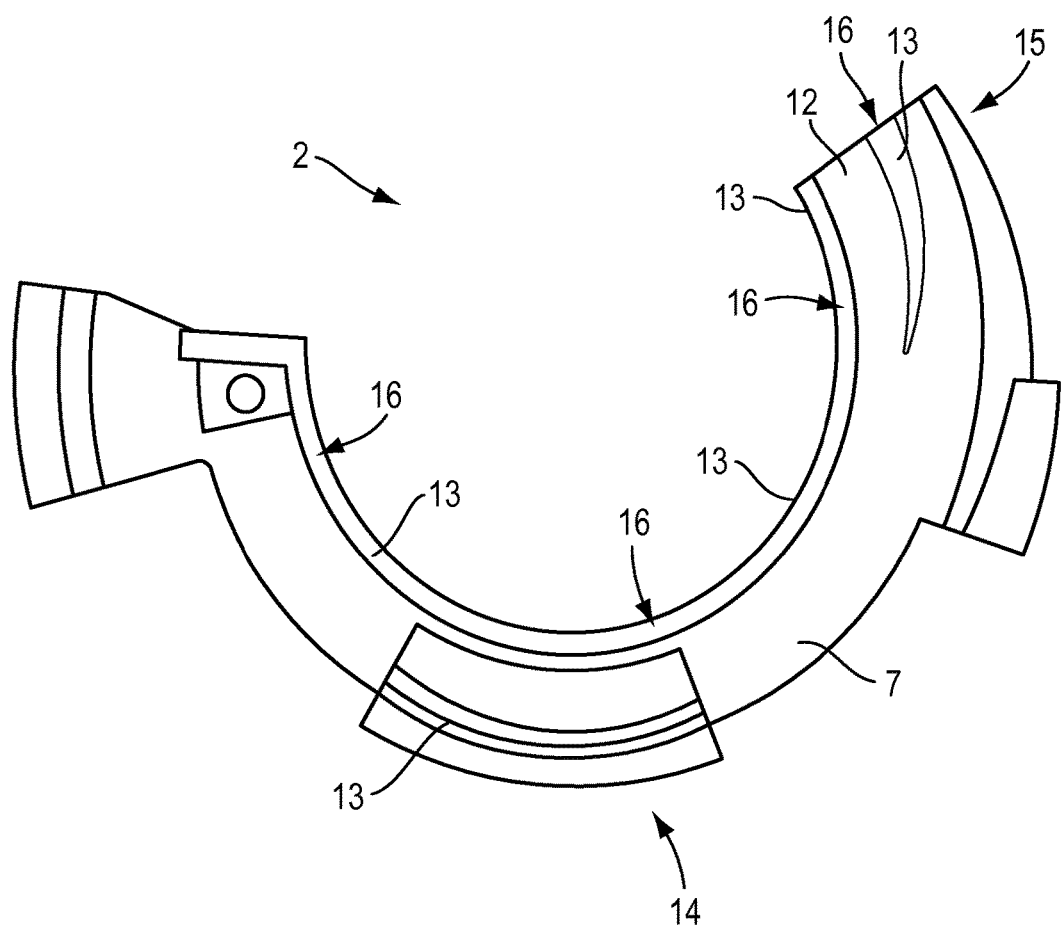
FIG. 5 is a top view of the second side of the spring isolator of FIG. 1.

With reference to FIGS. 4 and 5, the second side 7 of the spring isolator 2 includes a channel 12 configured to receive and at least partially surround the last coil 5 when the spring isolator 2 is positioned within the suspension 1 (see FIG. 1). As shown best perhaps in FIG. 4, the channel 12 runs along a periphery of the spring isolator 2 substantially over the entire length of the spring isolator 2, however, the depth and width of the channel 12 varies along its length. In this manner, when positioned within the suspension 1, the channel 12 will surround the last coil 5 to varying degrees depending on the depth and width of the channel 12.

In various exemplary embodiments, for example, the channel 12 includes a wall 13 partially along both sides of the channel 12. For example, as shown in FIGS. 4 and 5, in both a middle region 14 of the spring isolator 2 and in an end region 15 of the spring isolator 2, the wall 13 is formed in portions along the outside of the channel 12, while the wall 13 runs substantially the entire length of the channel 12 along the inside of the channel 12. Each wall 13 includes a first face 19 that is configured to receive and at least partially surround the last coil 5 (e.g., an inside face that faces the last coil 5 continues the form of the channel 12 so that it enlarges the depth of the channel 12), and a second face 20, which is opposite the first face (e.g., an outside face), which has a chamfered edge 16 (see FIG. 8).

As above, the channel 12, and the walls 13 continuing it, surround the last coil 5 of the coil spring 4 when the coil 5 is seated upon the second side 7 of the spring isolator 2 (see FIG. 1) so that foreign particles, such as, for example, dirt particles, sand grains, and/or other particulate debris, are prevented from getting into the contact area formed by the channel 12 and the walls 13 between the second side 7 and the last coil 5. To further ensure that the last coil 5 does not break contact with the second side 7, in various embodiments, the channel 12 may have a gradient that is optimally adapted to the gradient of the last coil 5. For example, the channel 12 may have a constant gradient in a peripheral direction of the spring isolator 2, which reaches its highest point in the end region 15 of the spring isolator 2.

Figure 6A:
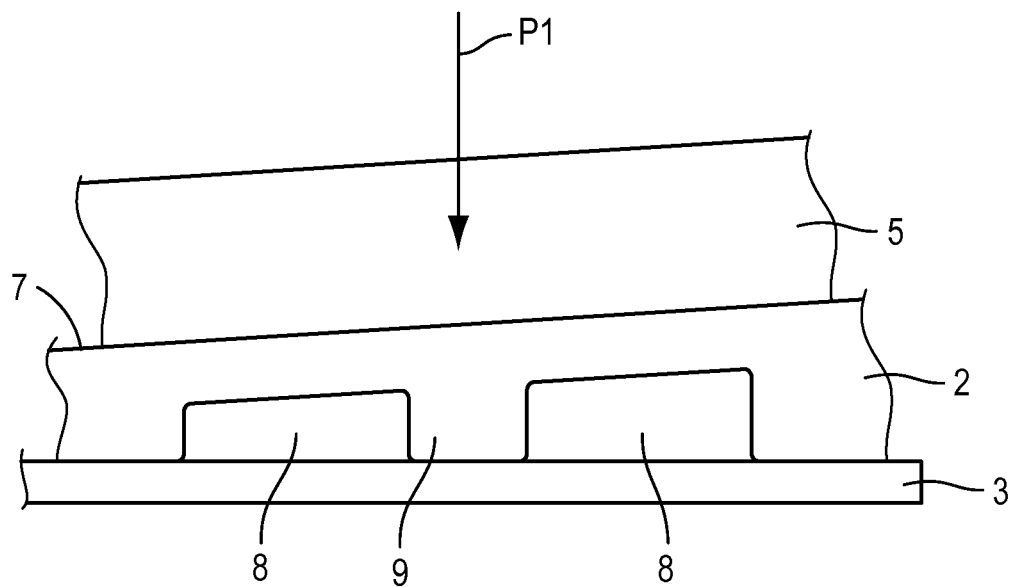
FIGS. 6A and 6B show two partial cross-sectional views, taken longitudinally to a coil, of the wheel suspension of FIG. 1, under different applied forces.
Figure 6B:
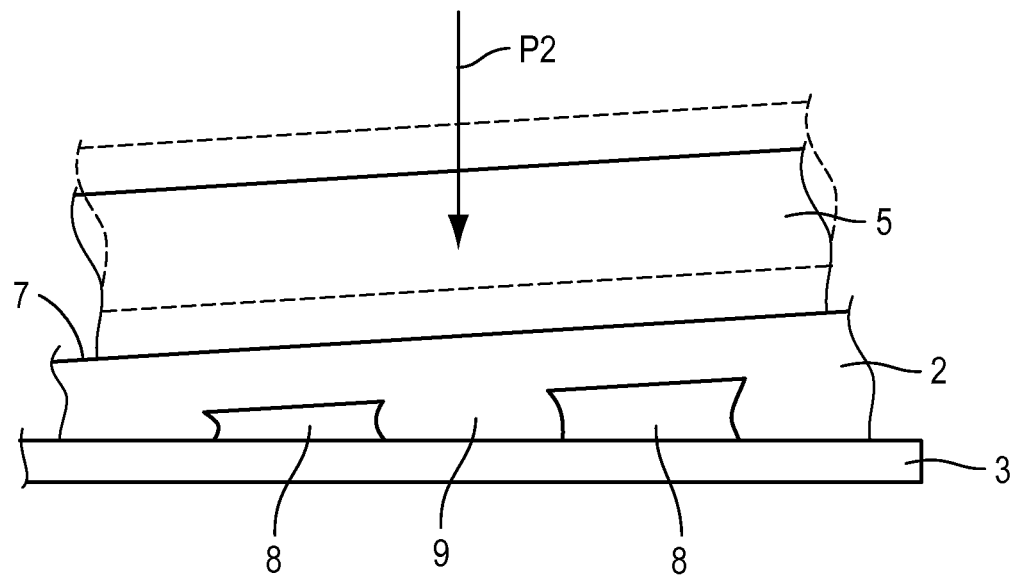

FIGS. 6A and 6B show two partial views depicting the spring isolator 2 and the last coil 5 of the wheel suspension 1 of FIG. 1 in cross-section, longitudinally to the coil 5, under two different applied forces P1 and P2. FIG. 6A shows a minimum force P1 such as can occur for example on maximum rebound of the wheel suspension 1. FIG. 6B shows a maximum force P2 such as can occur for example on maximum compression of the wheel suspension 1.

The two cross-sectional views show the two cavities 8 and the partition 9 present between the cavities 8. As above, the cavities 8 allow the spring isolator 2, which may be made of rubber material, to expand into the cavities 8 under an increasing force P2, as illustrated in FIG. 6B. Because of the elasticity of the spring isolator 2 provided by the cavities 8 and the partition 9, the spring isolator 2 is able to follow the spring movements of the coil spring 4, or the last coil 5, under any force P that is applied in the vertical direction. Accordingly, the second side 7 of the spring isolator 2 never breaks contact with the last coil 5, and the size of the contact area between the second side 7 and the last coil 5 remains substantially the same under the different forces P1 and P2 on the coil spring 4, thereby preventing foreign particles from getting into the contact area.

Figure 7A:
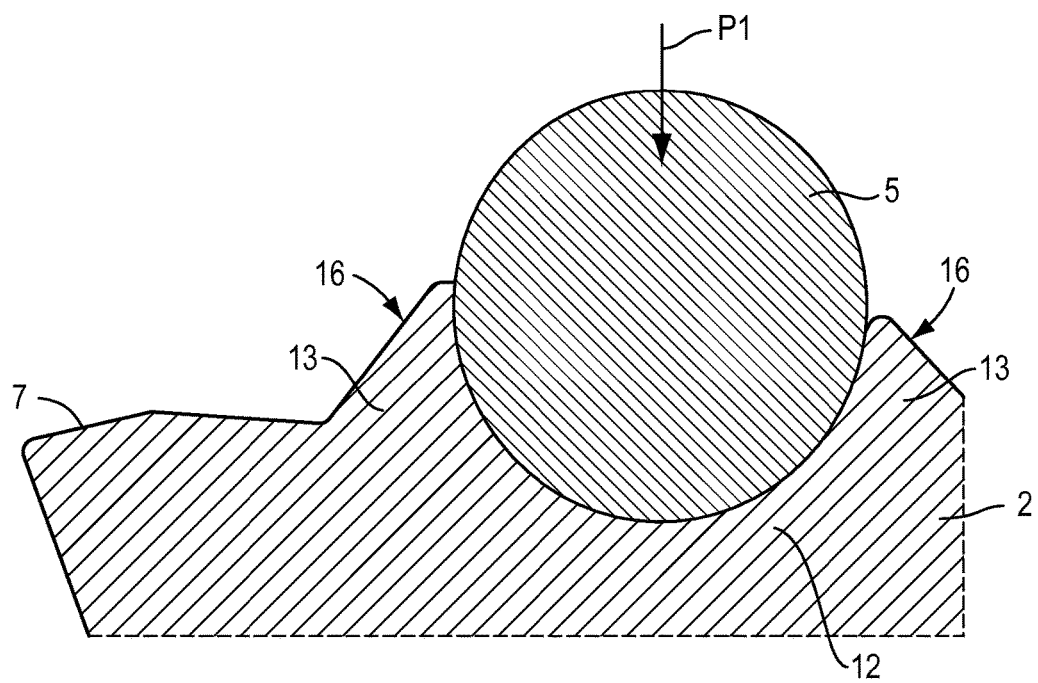
FIGS. 7A and 7B show two partial cross-sectional views, taken transversely to the coil, of the wheel suspension of FIG. 1, under different applied forces.
Figure 7B:
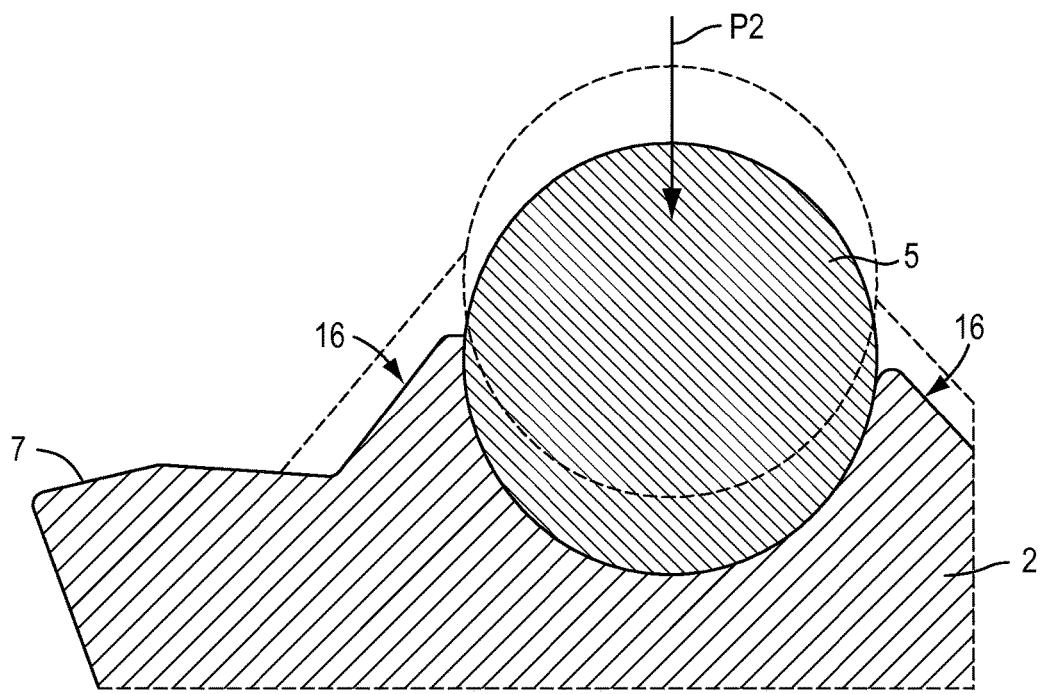

FIGS. 7A and 7B show two partial views depicting the spring isolator 2 and the last coil 5 of the wheel suspension 1 of FIG. 1 in cross-section, transversely to the coil 5, under two different applied forces P1 and P2. FIG. 7A shows a minimum force P1 such as can occur for example on maximum rebound of the wheel suspension 1. FIG. 7B shows a maximum force P2 such as can occur for example on maximum compression of the wheel suspension 1.

The two cross-sectional views show the last coil 5 of the coil spring 4 surrounded by the channel 12 and the walls 13 of the spring isolator 2. The chamfered edge 16 of the walls 13 is also shown. In comparison with FIG. 7A, FIG. 7B illustrates how the walls 13, together with the last coil 5, move down under a force P2, so that the size of the contact area between the second side 7 of the spring element 2 and the last coil 5 of the coil spring 4 remains substantially the same under the different forces P1 and P2 on the coil spring 4. This also helps to prevent foreign particles from getting into the contact area.

Figure 8:
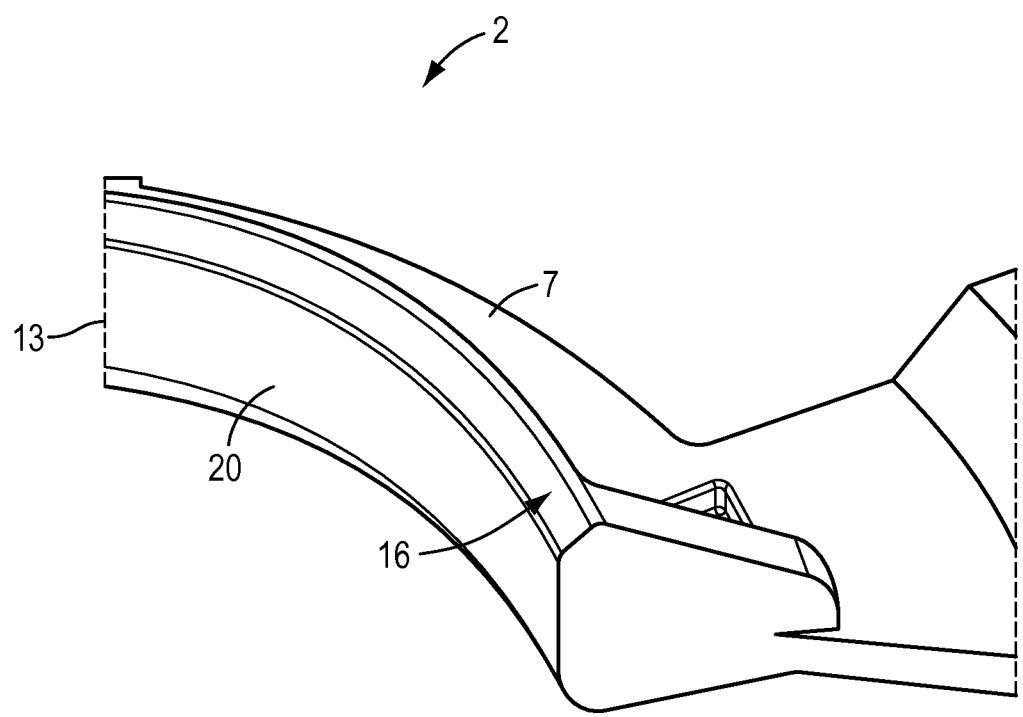
FIG. 8 is a partial, perspective side view of the spring isolator of FIG. 1.

FIG. 8 is a partial side view of the spring isolator 2, which shows the chamfered edge 16 of the second face 20 of the wall 13. The chamfered edge 16 of the wall 13 helps to ensure that foreign particles are deflected away from the region in which the end edge of the wall 13 lies directly adjacent to the last coil 5, thereby also helping to prevent the foreign particles from getting into the contact area between the coil 5 and the second side 7. As above, in various exemplary embodiments, the edge 16 has a chamfer angle of about 45° to the surrounding second side 7 of the spring isolator 2.

Figure 9A:
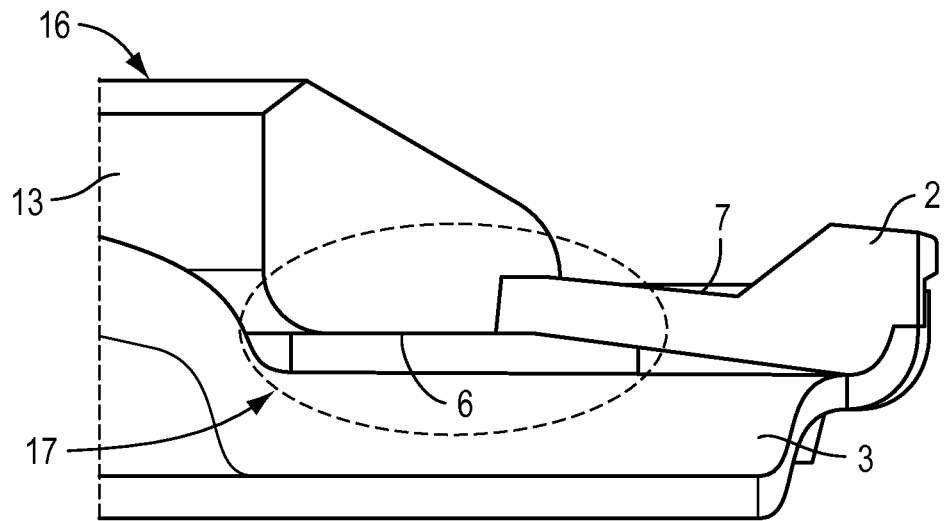
FIGS. 9A and 9B are partial side views of the spring isolator of FIG. 1 in two different installation states.
Figure 9B:
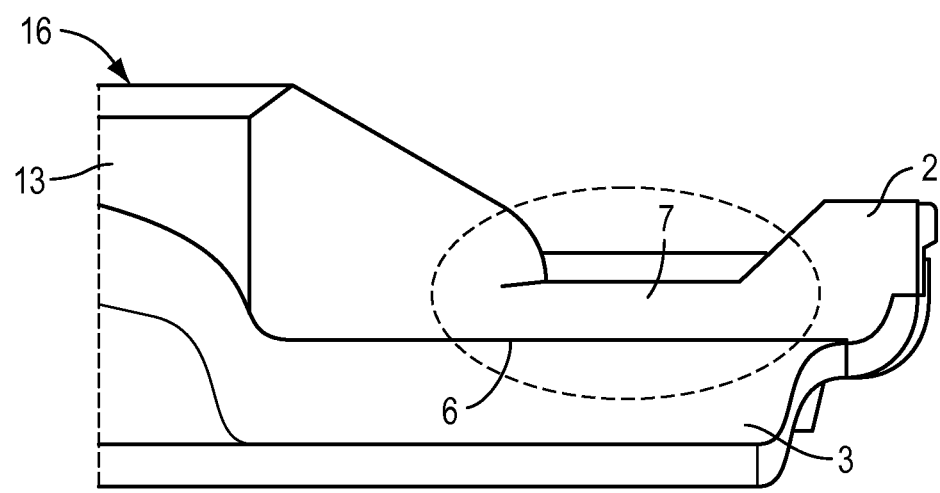

FIGS. 9A and 9B show the spring isolator 2 in two different installation states on the spring plate 3. FIG. 9A shows the spring isolator 2 in a non-assembled state (i.e., a state in which it is not assembled on the spring plate 3). FIG. 9B shows the spring isolator 2 in an assembled state (i.e. a state in which it is assembled on the spring plate 3). The exemplary spring isolator 2 shown in FIGS. 9A and 9B has a geometric design, which, in the assembled state, pretensions the second side 7 and the first side 6 in an axial direction of the coil spring 4 pointing away from the last coil 5 (i.e., in the direction of the spring plate 3).

As shown in FIGS. 9A and 9B, the spring isolator 2 is formed slightly curved, or with a kink radially from inside to outside. As shown in FIG. 9A, for example, because of the geometric design of the spring isolator 2, a gap 17 may be seen between the first side 6 and the spring plate 3. After application of the spring isolator 2 on the spring plate 3, as shown in the assembled state of FIG. 9B, the gap 17 closes and the radially outer part of the spring isolator 2 is pressed onto the spring plate 3 by the rest of the spring isolator 2. This design, therefore, prevents the spring isolator 2, in particular in the region of its outer edge, from lifting away from the spring plate 3 when a force is exerted on the spring isolator 2 by the coil spring 4, which also helps to keep foreign particles from getting between the spring isolator 2 and the spring plate 3.

Those of ordinary skill in the art would understand that the wheel suspension 1 and the spring isolator 2 illustrated and described above with reference to FIGS. 1-9 are exemplary only, and that spring isolators according to the present disclosure and vehicle wheel suspensions incorporating such spring isolators are not restricted to the exemplary embodiments disclosed herein, but may also comprise further embodiments with similar effect. For example, although a spring isolator made of a rubber material has been described herein, it would be understood that spring isolators in accordance with the present disclosure may be made of various other elastomer materials, which have elastic properties comparable to those of rubber.

Furthermore, those of ordinary skill would understand that spring isolators in accordance with the present disclosure may have various numbers and configurations of cavities, partitions, and/or channels, having various configurations, dimensions, and/or shapes, without departing from the scope of the present disclosure and claims.

Accordingly, while the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims. Furthermore, although the present disclosure has been discussed with relation to motor vehicles, those of ordinary skill in the art would understand that the present teachings as disclosed would work equally well for any type of vehicle having one or more wheels connected to the vehicle via a suspension.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A spring isolator for a wheel suspension, comprising:
    a first side configured to rest on a spring plate of the suspension; and
    a second side, opposite the first side, configured to receive a last coil of a coil spring of the suspension to support the coil spring on the spring plate;
    wherein the first side has at least one cavity extending through a thickness of the isolator toward the second side, the at least one cavity having an opening configured to allow air to escape from the cavity when a force is applied to the spring isolator, or flow into the cavity upon removal of the force from the spring isolator,
    wherein an elasticity of the isolator between the first and second sides prevents the last coil from breaking contact with the second side during operation of the suspension, and
    wherein the elasticity of the isolator is defined by a length, width, and/or depth of the at least one cavity.

2. The spring isolator of claim 1, wherein the spring isolator is made of a rubber material.

3. The spring isolator of claim 1, wherein the at least one cavity comprises a plurality of cavities separated from each other by a partition.

4. The spring isolator of claim 3, wherein the elasticity of the isolator is further defined by a length and/or thickness of the partition.

5. The spring isolator of claim 1, wherein the first side includes a channel.

6. The spring isolator of claim 5, wherein the elasticity of the isolator is further defined by a width and/or a depth of the channel.

7. The spring isolator of claim 1, wherein the second side includes a channel configured to receive and at least partially surround the last coil.

8. The spring isolator of claim 7, wherein the channel includes a wall at least partially along one side of the channel, the wall having a first face configured to receive and at least partially surround the last coil.

9. The spring isolator of claim 8, wherein the wall has a second face, opposite the first face, the second face having a chamfered edge.

10. The spring isolator of claim 1, wherein the spring isolator has a geometric design that, when placed on the spring plate, pretensions the first and second sides of the isolator in an axial direction of the coil spring.

11. The suspension of claim 1, wherein the at least one cavity has an oval shape that is elongated along a circumferential direction of the spring isolator.

12. A wheel suspension, comprising:
    a coil spring;
    a spring plate; and
    a spring isolator positioned between the coil spring and the spring plate, the spring isolator comprising first and second opposite sides,
    wherein the first side rests on the spring plate and the second side supports a last coil of the coil spring,
    wherein the first side has at least one cavity extending through a thickness of the spring isolator toward the second side, the at least one cavity being configured to maintain contact between the last coil and the second side during operation of the suspension and having an opening configured to allow air to escape from the cavity when a force is applied to the spring isolator, or flow into the cavity upon removal of the force from the spring isolator, and
    wherein an elasticity of the spring isolator between the first and second sides is defined by a length, width, and/or depth of the at least one cavity.

13. The suspension of claim 12, wherein the at least one cavity comprises a plurality of cavities separated from each other by a partition.

14. The suspension of claim 13, wherein the elasticity of the isolator is further defined by a length and/or thickness of the partition.

15. The suspension of claim 12, wherein the at least one cavity has an oval shape that is elongated along a circumferential direction of the spring isolator.

16. A method for maintaining contact between a coil spring and a spring isolator under a vertical force on the spring, the method comprising:
during application of the force, expanding a material forming the spring isolator into a cavity within the isolator to increase an elasticity of the isolator;
purging air from the cavity via an opening extending through a wall forming the cavity; and
following spring movements of the coil spring with the spring isolator such that a contact surface area between the isolator and the spring remains constant.

17. The method of claim 16, wherein expanding the material forming the spring isolator into the cavity comprises expanding a rubber material forming the spring isolator into the cavity.

18. The method of claim 17, wherein following the movements of the coil spring with the spring isolator comprises bending the rubber material via the increased elasticity.

19. A spring isolator for a wheel suspension, comprising:
a first side configured to rest on a spring plate of the suspension; and
a second side, opposite the first side, configured to receive a last coil of a coil spring of the suspension to support the coil spring on the spring plate;
wherein the first side has a plurality of cavities extending through a thickness of the isolator toward the second side, each of the plurality of cavities being elongated along a circumferential direction of the spring isolator such that a length of each cavity along the circumferential direction of the spring isolator is greater than a width of each cavity along a radial direction of the spring isolator, and
wherein an elasticity of the isolator between the first and second sides prevents the last coil from breaking contact with the second side during operation of the suspension.

20. The spring isolator of claim 19, wherein the plurality of cavities are separated from each other by a partition, wherein the elasticity of the isolator is defined by a length, width, and/or depth of each of the plurality of cavities and by a length and/or thickness of the partition.

21. The spring isolator of claim 19, wherein at least one of the plurality of cavities has an oval shape.

22. A method of maintaining contact between a coil spring and a spring isolator, comprising:
during application of a force to the spring:
increasing an elasticity of the isolator by deforming a portion of the isolator into a cavity within the isolator; and
purging air from the isolator via an opening extending through a wall forming the cavity,
wherein increasing the elasticity maintains a substantially constant area of contact between the isolator and the spring.

* * * * *